US012637570B2

(12) United States Patent
Westenberg et al.

(10) Patent No.: US 12,637,570 B2
(45) Date of Patent: May 26, 2026

(54) SOLID CARBON BLACK MATERIAL, PREPARATION THEREOF AND COMPOSITIONS AND ARTICLES CONTAINING THE SAME

(71) Applicant: Orion Engineered Carbons IP GmbH & Co. KG, Monheim (DE)

(72) Inventors: Hauke Westenberg, Brühl (DE); Conny Vogler, Ruppichteroth (DE); Werner Niedermeier, Brühl (DE)

(73) Assignee: Orion Engineered Carbons IP GmbH & Co. KG, Monheim (DE)

( * ) Notice: Subject to any disclaimer, the term of this patent is extended or adjusted under 35 U.S.C. 154(b) by 546 days.

(21) Appl. No.: 18/042,822

(22) PCT Filed: Jul. 29, 2021

(86) PCT No.: PCT/EP2021/071273
§ 371 (c)(1),
(2) Date: Feb. 24, 2023

(87) PCT Pub. No.: WO2022/042994
PCT Pub. Date: Mar. 3, 2022

(65) Prior Publication Data
US 2023/0348728 A1 Nov. 2, 2023

(30) Foreign Application Priority Data

Aug. 27, 2020 (EP) .................................... 20193023

(51) Int. Cl.
*C09C 1/56* (2006.01)
*C08K 3/04* (2006.01)

(52) U.S. Cl.
CPC ................ *C09C 1/565* (2013.01); *C08K 3/04* (2013.01); *C01P 2006/12* (2013.01); *C01P 2006/19* (2013.01); *C01P 2006/90* (2013.01); *C08K 2201/006* (2013.01)

(58) Field of Classification Search
CPC ....... C09C 1/48–60; C09C 1/565; C09C 1/56; C09C 1/50; C08K 3/04; C08K 2201/006; C08K 2201/019; C01P 2006/12; C01P 2006/19; C01P 2006/90; B60C 1/00; B60C 1/0016; C08L 21/00
See application file for complete search history.

(56) References Cited

U.S. PATENT DOCUMENTS

| | | | |
|---|---|---|---|
| 5,248,722 A | 9/1993 | DeTrano et al. | |
| 6,120,594 A | 9/2000 | Curtis et al. | |
| 6,471,933 B1 | 10/2002 | Dotson | |
| 8,975,316 B2 | 3/2015 | Belmont et al. | |
| 9,923,205 B2 | 3/2018 | Korchev et al. | |
| 2017/0073477 A1 | 3/2017 | Nishiura et al. | |

FOREIGN PATENT DOCUMENTS

| | | | |
|---|---|---|---|
| EP | 0263412 A2 | 4/1988 | |
| EP | 3385316 A1 | 10/2018 | |
| JP | H1036727 A | 2/1998 | |
| JP | H1192703 A | 4/1999 | |
| JP | 2015214625 A | 12/2015 | |
| TW | I465500 B | 12/2014 | |
| WO | 2011028337 A2 | 3/2011 | |
| WO | WO-2017015111 A1 * | 1/2017 | ............ H01M 4/625 |

OTHER PUBLICATIONS

Sutherland et al., "Effects of ozone oxidation on carbon black surfaces", Journal of Materials Science 31 (1996) 5651 5655. (Year: 1996).*
Donnet, "Carbon Black", Science and Technology Second Edition, Revised and Expanded, 1993, pp. 1-460, CRC Press.
Park, Soo-Jin et al., "Influence of surface characteristics of carbon blacks on cure and mechanical behaviors of rubber matrix compoundings", Journal of Colloid and Interface Science, 2005, pp. 229-235, vol. 291.

* cited by examiner

*Primary Examiner* — Anthony J Zimmer
(74) *Attorney, Agent, or Firm* — The Webb Law Firm

(57) ABSTRACT

The present disclosure provides a solid carbon black material including an oxidized carbon black having a pH of greater than 7, compositions including such solid carbon black material and a polymer component as well as articles made therefrom. The disclosure also concerns a method for manufacturing said solid carbon black material. The solid carbon black material is particularly useful for obtaining rubber compounds with low hysteresis, e.g. for the production of energy-saving tires, with enhanced curing rates compared to the use of conventional oxidized carbon blacks.

19 Claims, 1 Drawing Sheet

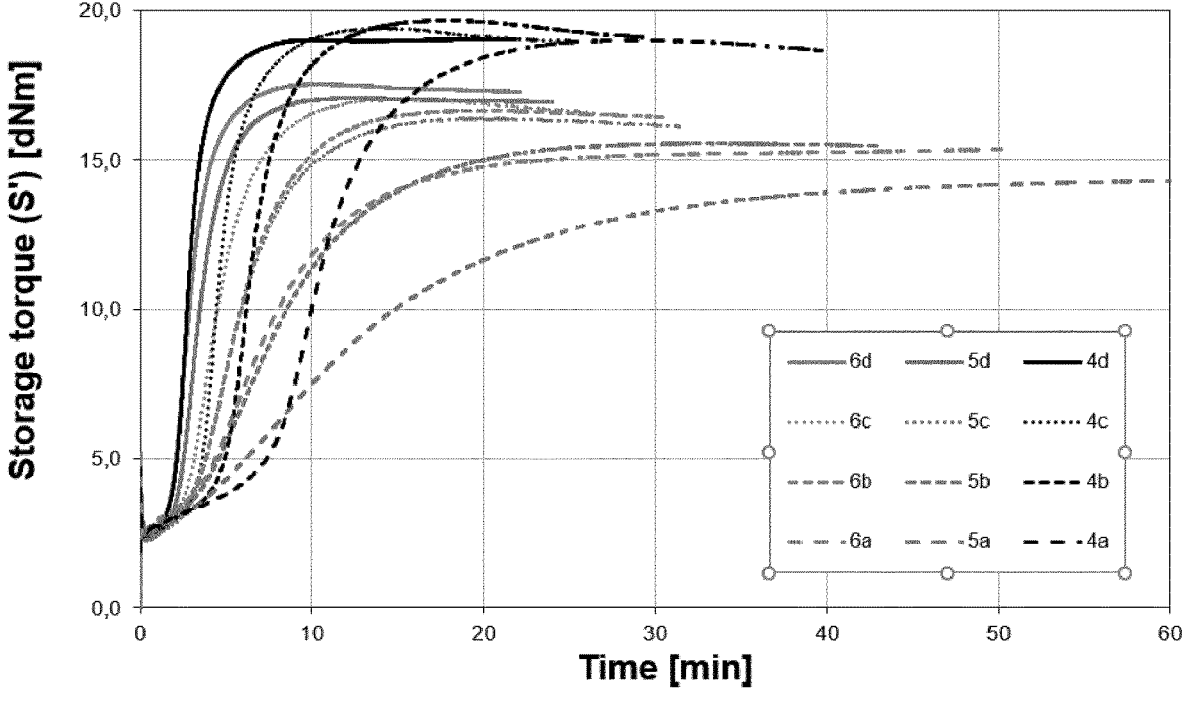

SOLID CARBON BLACK MATERIAL, PREPARATION THEREOF AND COMPOSITIONS AND ARTICLES CONTAINING THE SAME

CROSS-REFERENCE TO RELATED APPLICATIONS

This application is the United States national phase of International Application No. PCT/EP2021/071273 filed Jul. 29, 2021, and claims priority to European Patent Application No. 20193023.7 filed Aug. 27, 2020, the disclosures of which are hereby incorporated by reference in their entireties.

BACKGROUND OF THE INVENTION

Field of the Invention

The present disclosure relates to a solid carbon black material comprising an oxidized carbon black, more particular a basic oxidized carbon black, related polymer compositions, particularly vulcanizable rubber compositions, and articles made therefrom as well as respective preparation processes. The solid carbon black material is particularly useful for obtaining rubber products with reduced hysteresis, such as for tire applications, with enhanced curing rates compared to the use of conventional oxidized carbon blacks.

Description of Related Art

Polymeric compositions such as rubber compositions are widely applied for manufacturing numerous industrial products such as transmission and conveyor belts, tires or footwear. Carbon blacks are included in many polymer compositions, for example for modifying their color, mechanical, electrical, and/or processing properties. Carbon blacks are for instance commonly added to rubber compositions used to fabricate tires or components thereof to impart electrically dissipative properties to the insulating matrix. At the same time, carbon black additives affect the mechanical and elastic properties, such as stiffness, abrasion resistance and hysteresis, which affect to a great extent the performance of the resulting tire, e.g. in terms of its rolling resistance and durability. Herein, carbon blacks tend to form networks in the matrix via strong filler-filler interactions, which are the main source of heat-build up in the rubber component. Due to increasing regulatory provisions and environmental strains there is an increasing demand for energy-saving tires with a low rolling resistance. At the same time other performance parameters such as grip, traction and durability shall not be adversely affected. This represents often competing requirements.

One option for reducing the energy being lost in form of heat during deformation of a rubber material, which is reflected by a lower value of hysteresis, resides in reducing the filler-filler interactions by increasing the interactions of the carbon black filler with the rubber matrix. The hysteresis may also be reduced by reducing the carbon black loading and/or increasing the particle size of the carbon black. However, this may concomitantly degrade e.g. the electrically dissipative properties and/or the mechanical properties such as abrasion resistance, fracture resistance or chipping resistance.

Alternatively, there have been developments to chemically modify the rubber material and/or the carbon black filler in order to strengthen the filler-rubber interactions.

For example, U.S. Pat. No. 5,248,722 describes elastomeric compositions with reduced rolling resistance in tire tread applications by utilizing terminally functionalized polymers in combination with acid-functional oxidized carbon black. The terminally functionalized polymers however are not readily available and need to be prepared in a dedicated step by reacting a tin or nitrogen containing compound with a polymer prepared by polymerization of at least one diene monomer and optionally one or more vinyl substituted aromatic monomers.

According to WO 2011/028337 the use of surface-treated carbon blacks in conjunction with a functionalized SBR polymer having functionalization in terms of oxygen-containing groups such as carboxylic acid or hydroxyl groups along the chain enhances carbon black-elastomer interaction and yields reductions in hysteresis and benefits in wet traction relative to the use of conventional carbon black containing compounds. The surface-treatment of the carbon blacks can involve an oxidation of the carbon black followed by treatment with a base such as an amine. The surface-treated carbon blacks are still acidic exhibiting a pH<7.

It has been found though that the use of acid-functional oxidized carbon blacks, while improving certain physicochemical properties of polymer compositions, significantly inhibits and slows down curing compared to non-oxidized carbon blacks, thus requiring either substantially longer curing times to achieve proper mechanical properties or the use of relatively high amounts of cure accelerators to achieve reasonable curing times and proper mechanical properties. Both options increase the costs. Moreover, there are environmental and/or toxicological concerns for many cure accelerators. For example, N,N-diphenylguanidine (DPG), which is commonly used as cure accelerator in curable rubber compositions, is currently classified as possibly toxic to reproduction according to EU REACH regulation. There is thus a need to minimize, or if possible avoid, the use of such substances.

It would therefore be desirable to provide a carbon black based additive that improves relevant properties of polymer compositions, such as rubber compositions which exhibit improved hysteresis, e.g. for the production of tires with a low rolling resistance, without adversely affecting the curing characteristics of the polymer composition or requiring the need of costly, potentially harmful auxiliary substances. The carbon black based additive should further be provided in a form that is convenient to process and handle.

Accordingly, it is an objective of the present invention to provide a carbon black based material that can impart the above-mentioned properties to polymer compositions, such as rubber compounds, alleviating or avoiding the disadvantages of the prior art. Provision of the carbon black base material should be achievable in an efficient and economic manner making use of readily available components and processing techniques. The present invention aims in particular to provide vulcanizable rubber composition that yield improved hysteresis suitable for the production of tires without impaired curing characteristics or the need for potentially harmful curing accelerators, seen for conventional oxidized carbon black additives.

SUMMARY OF THE INVENTION

It has now surprisingly been found that the above objective can be achieved by a solid carbon black material comprising an oxidized carbon black having a pH of greater than 7 as specified in appended independent claim 1. Specific or preferred variants of the solid carbon black material of the present invention are set forth in the dependent claims.

The solid carbon black material of the present invention can be obtained by a process comprising:

(i) providing an oxidized carbon black, and (ii) treating the oxidized carbon black with a base, preferably an aqueous alkali metal hydroxide solution, and (iii) optionally wet beading the oxidized carbon black.

The present invention also concerns compositions that comprise a polymer component and the solid carbon black material according to the present invention as well as articles prepared from such compositions. The composition can in particular be a vulcanizable rubber composition.

The solid carbon black material according to the invention can be obtained from commercially available ingredients using common processing techniques in an efficient manner at low costs. It is convenient to process and handle, not involving potentially disturbing or diluting carrier media, contrary to for example liquid systems such as dispersions. The solid carbon black material according to the present invention has been found to impart favorable physical properties to polymer compositions, particularly yielding a significantly reduced hysteresis to rubber compositions, rendering them particularly interesting for the production of energy-saving tires, without affecting the curing characteristics. In fact, it has been found that curable polymer compositions comprising the solid carbon black material according to the invention can be cured as rapidly as corresponding compositions with non-oxidized carbon blacks without the need for additional cure accelerator. The solid carbon black material thus enables to minimize or avoid the use of potentially harmful cure accelerators such as DPG.

These and other optional features and advantages of the present invention are described in more detail in the following description.

BRIEF DESCRIPTION OF THE DRAWING

FIG. 1 shows curing in terms of plots of measured torque versus time for rubber compositions containing the solid carbon black material according to the invention (Example 3) versus corresponding rubber compositions with a non-oxidized carbon black (Example 1) and a conventional acidic oxidized carbon black (Example 2), each with different concentrations of curing accelerator.

DESCRIPTION OF THE INVENTION

As used herein, the term "comprising" is understood to be open-ended and to not exclude the presence of additional undescribed or unrecited elements, materials, ingredients or method steps. The terms "including", "containing" and like terms are understood to be synonymous with "comprising". As used herein, the term "consisting of" is understood to exclude the presence of any unspecified element, ingredient or method step.

As used herein, the singular form of "a", "an", and "the" include plural referents unless the context clearly dictates otherwise.

Unless indicated to the contrary, the numerical parameters and ranges set forth in the following specification and appended claims are approximations. Notwithstanding that the numerical ranges and parameters setting forth the broad scope of the invention are approximations, the numerical values set forth in the specific examples are reported as precisely as possible. Any numerical values, however, contain errors necessarily resulting from the standard deviation in their respective measurement.

Also, it should be understood that any numerical range recited herein is intended to include all subranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g. 1 to 6.3, or 5.5 to 10, or 2.7 to 6.1.

As mentioned above, the present invention relates to a solid carbon black material comprising an oxidized carbon black having a pH of greater than 7.

A "carbon black material" as used herein refers to a material, which is based on one or more carbon black(s). The carbon black material accordingly usually comprises at least 50 wt. %, such as at least 70 wt. % or at least 80 wt. %, typically at least 90 wt. %, or at least 95 wt. %, or at least 98 wt. % or at least 99 wt. %, or at least 99.5 wt. % or at least 99.9 wt. % of one or more than one carbon black(s), based on the total solids weight of the material. The carbon black material can thus substantially consist of carbon black(s). The term "substantially consist of" as used herein means that the material contains substances other than the recited ones if at all only as impurities not deliberately added in amounts that are so low that they generally do not significantly affect the properties of the material. For example, the amount of such non-recited substances other than carbon black in the material could be 0.1 wt. % or less. The carbon black material may for example consist of carbon black(s), i.e. be composed of 100 wt. % of one or more than one carbon black.

A "carbon black" as referred to herein means a material composed substantially, e.g. to more than 80 wt. %, or more than 90 wt. % or more than 95 wt. %, based on its total weight, of carbon that is produced by controlled partial pyrolysis from one or more than one hydrocarbon precursor(s). Different industrial processes are known for the production of carbon blacks such as the furnace process, gas black process, acetylene black process, thermal black process or lamp black process. The production of carbon blacks is per se well known in the art and for example outlined in J.-B. Donnet et al., "Carbon Black: Science and Technology", 2nd edition, therefore being not described herein in more detail. The carbon black material used in the practice of the present invention can comprise a single type of carbon black or a mixture of two or more different carbon black grades.

As mentioned above, the solid carbon black material according to the present invention comprises an oxidized carbon black. The term "oxidized carbon black" as used herein refers to a carbon black that has been subjected to an oxidative treatment and thus comprises oxygen-containing functional groups. Oxidized carbon blacks, unlike non-oxidized carbon blacks, thus generally have a notable oxygen content and have oxygen-containing functional groups, which can be exemplified, but are not limited to, quinone, carboxyl, phenol, lactol, lactone, anhydride and ketone groups.

Oxidized carbon blacks can be produced by various methods known in the art such as for example disclosed in U.S. Pat. Nos. 6,120,594 and 6,471,933. Suitable methods include oxidation of a carbon black material with an oxidizing agent as for example peroxides such as hydrogen peroxide, persulfates such as sodium and potassium persulfates, hypohalites such as sodium hypochlorite, ozone or oxygen gas, transition metal-containing oxidants such as permanganate salts, osmium tetroxide, chromium oxides, ceric ammonium nitrates or oxidizing acids such as nitric acid or perchloric acid, and mixtures or combinations thereof. Conventional oxidized carbon blacks have acid-functionality and typically exhibit a pH in the range of 2-6.

The oxidized carbon black used in the solid carbon black material of the present invention on the contrary has basic functionality rather than acid functionality. In other words, the oxidized carbon black according to the present invention has a pH of greater than 7. For example, the oxidized carbon black according to the present invention can have a pH of 7.1 or more, or a pH of 7.2 or more, or a pH of 7.5 or more, or a pH of 7.8 or more, or a pH of 8.0 or more, or a pH of 8.5 or more, or a pH of 9.0 or more, or a pH of 9.5 or more, or a pH of 10.0 or more. For example, the oxidized carbon black according to the present invention can have a pH of up to 12.0, such as up to 11.5, or a pH of up to 11.0, or a pH of up to 10.5, or a pH of up to 10.0, or a pH of up to 9.5, or a pH of up to 9.0, or a pH of up to 8.5. The oxidized carbon black can have a pH in a range between any of the recited lower and upper limit values. For example, the oxidized carbon black according to the present invention can have a pH in a range of 7.1 to 12.0, such as in a range from 7.2 to 10.5 or in a range from 7.5 to 9.5 or in a range from 8.0 to 9.0. The recited pH of the oxidized carbon black is each as determined according to ASTM D1512-15b Test Method B—Sonic Slurry.

The degree of oxidation of the oxidized carbon black used in the practice of the invention can vary. For example, the oxidized carbon black can have an oxygen content of 0.5 wt. % or more, such as 1.0 wt. % or more, or 2.0 wt. % or more, or 3.0 wt. % or more, or 4.0 wt. % or more, or 5.0 wt. % or more, or 7.5 wt. % or more, or 10.0 wt. % or more, based on the total weight of the oxidized carbon black. Typically, the oxygen content of the oxidized carbon black does not exceed 20 wt. %, based on the total weight of the oxidized carbon black material. For example, the oxidized carbon black can have an oxygen content of up to 20 wt. %, such as up to 15 wt. %, or up to 10 wt. %, or up to 8.0 wt. %, or up to 7.0 wt. %, or up to 6.0 wt. %, or up to 5.0 wt. %, or up to 4.0 wt. %, based on the total weight of the oxidized carbon black. The oxidized carbon black according to the present invention can have an oxygen content in a range between any of the recited lower and upper limit values. For example, the oxidized carbon black can have an oxygen content in a range from 0.5 wt. % to 20.0 wt. %, or from 1.0 wt. % to 15.0 wt. %, or from 2.0 wt. % to 10.0 wt. %, or from 2.0 wt. % to 5.0 wt. %, based on the total weight of the oxidized carbon black material. The oxygen content can be determined by elemental analysis as set forth in more detail in the Examples.

The oxidized carbon black according to the present invention can further be characterized by its content of volatiles. The volatile content as mentioned herein is each as determined by thermogravimetry at a temperature of 950° C. as described in detail in the Examples. For example, oxidized carbon black can have a volatile content of 1.0 wt. % or more, such as 1.5 wt. % or more, or 2.0 wt. % or more, or 2.5 wt. % or more, or 3.0 wt. % or more, or 3.5 wt. % or more, or 4.0 wt. % or more, or 5.0 wt. % or more, or 7.5 wt. % or more, or 10.0 wt. % or more, based on the total weight of the oxidized carbon black. For example, the oxidized carbon black can have a volatile content of 20.0 wt. % or less, such as 15.0 wt. % or less, such as 10.0 wt. % or less, or 8.0 wt. % or less, or 7.0 wt. % or less, or 6.0 wt. % or less, or 5.0 wt. % or less, based on the total weight of the oxidized carbon black. The oxidized carbon black according to the present invention can have a volatile content in a range between any of the recited lower and upper limit values. For example, the oxidized carbon black can have a volatile content in a range from 1.0 wt. % to 20 wt. %, or from 1.0 wt. % to 15.0 wt. %, or from 2.0 wt. % to 10.0 wt. %, or from 3.0 wt. % to 5.0 wt. %, based on the total weight of the oxidized carbon black material.

The oxidized carbon black used according to the invention can further be characterized by BET surface area, statistical thickness surface area (STSA), oil absorption number (OAN), oil absorption number for compressed sample (COAN), or iodine absorption number, as set forth more specifically in the following, or any combination thereof.

The oxidized carbon black according to the invention can for example have a BET surface area of 50 $m^2/g$ or more, such as 60 $m^2/g$ or more, or 70 $m^2/g$ or more, or 75 $m^2/g$ or more, or 80 $m^2/g$ or more, or 85 $m^2/g$ or more, or 90 $m^2/g$ or more, or 95 $m^2/g$ or more. The oxidized carbon black can for example have a BET surface area of up to 500 $m^2/g$, such as 400 $m^2/g$ or less, or 300 $m^2/g$ or less, or 250 $m^2/g$ or less, or 200 $m^2/g$ or less, or 150 $m^2/g$ or less, or 130 $m^2/g$ or less, or 120 $m^2/g$ or less, or 110 $m^2/g$ or less, or 100 $m^2/g$ or less. The oxidized carbon black according to the present invention can have a BET surface area in a range between any of the recited lower and upper limit values. For example, the BET surface area of the oxidized carbon black of the present invention can be in a range of 50 to 500 $m^2/g$, such as 70 to 300 $m^2/g$, typically in a range of 75 to 250 $m^2/g$ such as of 80 to 200 $m^2/g$, or 90 to 150 $m^2/g$. The BET surface area can be determined according to ASTM D6556-17.

The oxidized carbon black used according to the invention can have a statistical thickness surface area (STSA) of 30 $m^2/g$ or more, such as 40 $m^2/g$ or more, or 50 $m^2/g$ or more, or 60 $m^2/g$ or more, or 70 $m^2/g$ or more, or 75 $m^2/g$ or more, or 80 $m^2/g$ or more, or 85 $m^2/g$ or more. The oxidized carbon black can for example have a STSA of up to 500 $m^2/g$, such as 400 $m^2/g$ or less, or 300 $m^2/g$ or less, or 250 $m^2/g$ or less, or 200 $m^2/g$ or less, or 150 $m^2/g$ or less, or 130 $m^2/g$ or less, or 120 $m^2/g$ or less, or 110 $m^2/g$ or less, or 100 $m^2/g$ or less. The oxidized carbon black according to the present invention can have a STSA in a range between any of the recited lower and upper limit values. For example, the oxidized carbon black of the present invention can have a STSA in a range from 30 to 500 $m^2/g$, such as 50 to 400 $m^2/g$, or 60 to 300 $m^2/g$, such as 70 to 200 $m^2/g$, or 80 to 150 $m^2/g$, or 85 to 120 $m^2/g$. The statistical thickness surface area (STSA) can be determined according to ASTM D6556-17.

The oxidized carbon black used according to the invention can have an oil absorption number (OAN) measured according to ASTM D2414-18 of 50 mL/100 g or more, such as 60 mL/100 g or more, or 70 mL/100 g or more, or 80 mL/100 g or more, or 90 mL/100 g or more, or 100 mL/100 g or more. The oxidized carbon black can for example have an oil absorption number (OAN) measured according to ASTM D2414-18 of 150 mL/100 g or less, such as 140 mL/100 g or less, or 130 mL/100 g or less, or 120 mL/100 g or less, or 110 mL/100 g or less. The oxidized carbon black according to the present invention can have an oil absorption number (OAN) measured according to ASTM D2414-18 in a range between any of the recited lower and upper limit values. For example, the oxidized carbon black of the present invention can have an oil absorption number (OAN) measured according to ASTM D2414-18 in a range from 50 to150 mL/100 g, such as of 60 to 140 mL/100 g, or 70 to 130 mL/100 g, or 80 to 120 mL/100 g, or 90 to110 mL/100 g.

The oxidized carbon black according to the invention can further have a compressed oil absorption number (COAN) of 50 mL/100 g or more, such as 60 mL/100 g or more, or 70 mL/100 g or more, or 80 mL/100 g or more, or 90 mL/100 g or more, or 95 mL/100 g or more. The oxidized carbon black according to the invention can have a compressed oil absorption number (COAN) of 150 mL/100 g or less, such as 140 mL/100 g or less, or 130 mL/100 g or less, or 120 mL/100 g or less, or 110 mL/100 g or less, or 100 mL/100 g or less. The oxidized carbon black according to the present invention can have a compressed oil absorption number (COAN) in a range between any of the recited lower and upper limit values. For example, the oxidized carbon black of the present invention can have a compressed oil absorption number (COAN) in a range from 50 to 150 mL/100 g such as of 60 to 140 mL/100 g, or of 70 to 130 mL/100 g, or of 80 to 120 mL/100 g, or of 90 to 100 mL/100 g. The COAN can be determined according to ASTM D3493-18.

The oxidized carbon black according to the invention can further have an iodine absorption number, as determined according to ASTM D1510-19, of 20 mg/g or more, such as 30 mg/g or more, or 40 mg/g or more, or 50 mg/g or more, or 55 mg/g or more, or 60 mg/g or more. The oxidized carbon black according to the invention can for example have an iodine absorption number, as determined according to ASTM D1510-19, of up to 300 mg/g, such as 250 mg/g or less, 200 mg/g or less, 150 mg/g or less, 120 mg/g or less, or 100 mg/g or less, or 90 mg/g or less, or 80 mg/g or less, or 70 mg/g or less. The oxidized carbon black according to the present invention can have an iodine absorption number, as determined according to ASTM D1510-19, in a range between any of the recited lower and upper limit values. For example, the oxidized carbon black of the present invention can have an iodine absorption number, as determined according to ASTM D1510-19, in a range from 20 to 300 mg/g, such as from 30 to 200 mg/g, or from 40 to 120 mg/g, or from 50 to 80 mg/g.

The oxidized carbon black according to the present invention process can be obtained by treating an initial oxidized carbon black with a base.

The initial oxidized carbon black can be produced by any of the methods known in the art for preparing oxidized carbon blacks such as those indicated above. A precursor carbon black can for example be oxidized with an oxidizing agent as for example peroxides such as hydrogen peroxide, persulfates such as sodium and potassium persulfates, hypohalites such as sodium hypochlorite, ozone or oxygen gas, transition metal-containing oxidants such as permanganate salts, osmium tetroxide, chromium oxides, ceric ammonium nitrates or oxidizing acids such as nitric acid or perchloric acid, and mixtures or combinations thereof. For example, the oxidized carbon black can be an ozone oxidized carbon black. The precursor carbon black that is subjected to oxidation can be any kind of carbon black, such as without being limited thereto, a furnace black, a lamp black, a gas black, or a combination thereof. Such carbon blacks are commercially available from different manufacturers including ORION Engineered Carbons GmbH. The oxidized carbon black can accordingly comprise, without being limited thereto, an oxidized furnace black, an oxidized lamp black, an oxidized gas black, or combinations thereof. Preferably the oxidized carbon black comprises an oxidized furnace black.

The thus provided initial oxidized carbon black is generally acidic, typically exhibiting a pH in the range of 2-6. For example, the initial oxidized carbon black that is to be treated with the base can comprise 20 µmol or more of carboxylic acid groups per g carbon black, such as 50 µmol or more of carboxylic acid groups per g carbon black, or 100 µmol or more of carboxylic acid groups per g carbon black, or 150 µmol or more of carboxylic acid groups per g carbon black, or 200 µmol or more of carboxylic acid groups per g carbon black, or 300 µmol or more of carboxylic acid groups per g carbon black. The initial oxidized carbon black that is to be treated with the base can comprise for example 500 µmol or less of carboxylic acid groups per g carbon black, such as 400 µmol or less of carboxylic acid groups per g carbon black, or 350 µmol or less of carboxylic acid groups per g carbon black, or 300 µmol or less of carboxylic acid groups per g carbon black, or 250 µmol or less of carboxylic acid groups per g carbon black, or 200 µmol or less of carboxylic acid groups per g carbon black. The initial oxidized carbon black that is to be treated with the base can comprise carboxylic acid groups in a range between any of the recited lower and upper limit values. For example, the oxidized carbon black of the present invention can comprise from 50 to 500 µmol carboxylic acid groups per g carbon black, or can comprise from 100 to 300 µmol carboxylic acid groups per g carbon black. The amount of carboxylic acid groups can be determined with high precision by titration as set forth in J. Ackermann, A. Krueger, "Highly sensitive and reproducible quantification of oxygenated surface groups on carbon nanomaterials", Carbon 163 (2020), 56-62.

The acid-functional oxidized carbon black is then treated with a base to form the oxidized carbon black according to the present invention having a pH greater than 7. Any kind of known base can in principle be used for this treatment. Suitable bases include for example, without being limited thereto, metal oxides, metal hydroxides, metal carbonates, and other basic metal salts, ammonia and amines, typically used as aqueous solution. Bases that may preferably be used according to the present invention include for example aqueous solutions of alkali metal hydroxides or alkaline earth metal hydroxides such as sodium hydroxide, potassium hydroxide or calcium hydroxide. A single base or a mixture of two or more different bases can be employed. The base is typically used in an about equimolar amount or a moderate excess of equivalents with respect to acidic groups in the oxidized carbon black. For example, the amount of base used can be such that the ratio of equivalents of the base to acidic groups in the initial oxidized carbon black that is to be treated is 0.8:1 or more, such as 0.9:1 or more, such as 1:1 or more, or 1.1:1 or more, or 1.2:1 or more, or 1.5:1 or more. The amount of base used can be such that the ratio of equivalents of the base to acidic groups in the initial oxidized carbon black that is to be treated is 2:1 or less, such as 1.8:1 or less, or 1.5:1 or less, or 1.3:1 or less, or 1.2:1 or less, or 1.1:1 or less. Said equivalents ratio can be in a range between any one of the recited lower and upper limit values. For example, the ratio of equivalents of the base to acidic groups in the initial oxidized carbon black that is to be treated can be in a range from 0.8:1 to 2:1, such as in a range from 0.9:1 to 1.5:1 or in a range from 0.9:1 to 1.2:1, or in a range from 1:1 to 1.1:1. The treatment with the base can comprise thoroughly mixing the base and the oxidized carbon black. Mixing can be carried out using conventional mixing equipment, typically for a duration of up to 10 minutes. However, other forms of treatment such as applying the base to the oxidized carbon black by spraying can likewise be used.

The treatment with the base may convert at least a portion of the acid-functional groups of the initial oxidized carbon black to their neutralized form. The oxidized carbon black according to the present invention may accordingly comprise salt groups. For example, the oxidized carbon black according to the present invention can comprise carboxylate groups such as alkali metal carboxylates or ammonium carboxylates. The oxidized carbon black according to the present invention can for instance comprise carboxylate groups in an amount of 20 μmol or more per g carbon black, or 50 μmol or more per g carbon black, or 100 μmol or more per g carbon black, or 150 μmol or more per g carbon black, or 200 μmol or more per g carbon black, or 300 μmol or more per g carbon black. The oxidized carbon black according to the present invention can for example comprise carboxylate groups in an amount of 500 μmol or less per g carbon black, such as 400 μmol or less per g carbon black, or 350 μmol or less per g carbon black, or 300 μmol or per g carbon black, or 250 μmol or less per g carbon black, or 200 μmol or less per g carbon black. The oxidized carbon black of the present invention can comprise carboxylate groups in amounts between any of the recited lower and upper limit values. For example, the oxidized carbon black of the present invention can comprise from 50 to 500 μmol carboxylate groups per g carbon black, or can comprise from 100 to 300 μmol carboxylate groups per g carbon black. The amount of carboxylate groups can be determined as the difference between the amount of carboxylic acid groups measured before the base treatment and the amount of carboxylic acid groups measured after the base treatment.

The acid-functional groups of the initial oxidized carbon black may mostly or even completely be neutralized by the base treatment. For instance, the acid-functional groups can be neutralized to a degree of at least 80%, such as at least 90% or at least 95%, or at least 99%, or at least 99.5% or at least 99.9%, or to a degree of 100%. The oxidized carbon black having a pH of greater than 7 can for example comprise less than 20 μmol/g, or less than 10 μmol/g, or less than 5 μmol/g, of carboxylic acid groups, such as substantially no carboxylic acid groups. "Substantially no carboxylic acid groups" means that the amount of carboxylic acid groups is either not measurable or has no measurable impact on the properties of the oxidized carbon black.

The oxidized carbon black according to the invention can further be characterized by its aggregate size distribution (ASD). The aggregate size distribution can be measured by light scattering using a Brookhaven BI-DCP disc centrifuge as described in the US patent application published as US 2019/0062522 A1. The oxidized carbon black according to the present invention may for instance have a modal diameter Dmode (also referred to as "mode"), which is the most frequent diameter in the ASD, of at least 10 nm, such as at least 20 nm, or at least 30 nm, or at least 40 nm, or at least 50 nm, or at least 60 nm, or at least 70 nm. It may for example have a mode of 500 nm or less, such as 300 nm or less, or 250 nm or less, or 200 nm or less, or 150 nm or less, or 100 nm or less. The oxidized carbon black according to the present invention can have a mode in a range between any of the recited lower and upper limit values. For example, it can have a mode in a range from 10 nm to 500 nm, such as from 30 nm to 200 nm, or from 50 nm to 100 nm. The width of the size distribution can be expressed by its full width at half maximum (FWHM), also referred to as ΔD50. According to DIN ISO 15825 ΔD50 represents the width of the distribution measured at the half-maximum point of the mode. The aggregate size distribution of the oxidized carbon black according to the present invention can for example have a ΔD50 of at least 10 nm, such as of at least 20 nm, or at least 30 nm, or at least 40 nm, or at least 50 nm, or at least 60 nm. It can for example have a ΔD50 of up to 300 nm, such as up to 250 nm, or up to 200 nm, or up to 150 nm, or up to 100 nm, or up to 80 nm. The oxidized carbon black according to the present invention can have a ΔD50 in a range between any of the recited lower and upper limit values. For example, it can have a ΔD50 in a range from 10 nm to 300 nm, such as from 30 nm to 150 nm, or from 50 nm to 80 nm. The aggregate size distribution of the oxidized carbon black according to the present invention mostly corresponds to the one of the selected precursor carbon black from which the oxidized carbon black is prepared and can accordingly be adjusted as desired or needed.

The carbon black material that comprises the oxidized carbon black according to the present invention is in solid form. For example, the solid carbon black material can be in the form of a powder. Alternatively, the solid carbon black material can be in the form of beads/pellets. As will be understood by the skilled reader, the solid carbon black material is thus distinguished from carbon black materials provided in other (non-solid) form such as liquid dispersions. Beads or pellets can be formed by wet or dry pelletizing a respective pulverulent starting material. In such case, forming the solid carbon black material thus generally further comprises pelletizing the oxidized carbon black, which can occur concurrently or after the above-mentioned base treatment. According to the present invention preferably wet pelletizing can be employed, wherein the base can be used as wet beading medium, which may optionally contain an organic binder and/or one or more pelletizer(s) as auxiliary ingredients. Pelletizing of the pulverulent oxidized carbon black can be carried out using common pelletizing equipment such as agitation granulation systems like a ring layer mixer granulator, e.g. in a one-step wet pelletizing process analogous to EP 2 913 368 A1. The obtained pellets may further be dried after the pelletizing step, for example in a rotational drum dryer. Drying can be carried out at a temperature in a range from 100° C. to 250° C., for example at a temperature in a range from 110° C. to 180° C. or 120° C. to 160° C. Drying time can be selected accordingly to achieve the desired degree of drying, e.g. a residual moisture content of below 1%. The properties of the pellets can be controlled by adjusting the parameters of the pelletizing process. For example, an increased rotational speed of the granulator at constant weight ratio of wet beading medium to powder generally leads to smaller pellets, whereas an increased wet beading medium-to-powder weight ratio favours the formation of larger pellets. The as-prepared pelletized carbon black material according to the present invention may be characterized by its pellet size distribution, which can be determined according to ASTM D1511-10. The pelletized carbon black material according to the present invention may in particular have a low proportion of undesirable fines. Thus, it may comprise less than 1 wt. %, or less than 0.5 wt. %, or less than 0.3 wt. %, of pellets with a size of less than 0.125 mm, based on the total weight of the pelletized carbon black material. The proportion of pellets having a pellet size of less than 0.5 mm can be 15 wt. % or less, such as 10 wt. % or less, or 5 wt. % or less, or 2 wt. % or less, based on the total weight of the pelletized carbon black material. The amount of pellets having a size in an intermediate range of 1.0 mm to 2.0 mm, which is considered desirable in terms of processing properties, can be 30 wt. % or more, such as 40 wt. % or more, or 50 wt. % or more, based on the total weight of the pelletized carbon black material. The prepared pelletized carbon black material can optionally further be size fractionated using standard methods like sieve classification to obtain a material of appropriate pellet sizes.

The solid carbon black material may comprise the oxidized carbon black having a pH of greater than 7 in any amount. The solid carbon black material may comprise the oxidized carbon black having a pH of greater than 7 for example in an amount of at least 10 wt. %, or at least 30 wt. %, or at least 50 wt. %, or at least 80 wt. %, or at least 90 wt. %, or at least 95 wt. %, or at least 99 wt. %, based on the total weight of the solid carbon black material. The solid carbon black material may comprise the oxidized carbon black having a pH of greater than 7 in an amount of up to 100 wt. %, such as 99.5 wt. % or less, or 99.0 wt. % or less, or 95 wt. % or less, or 90 wt. % or less, or 80 wt. % or less, or 70 wt. % or less, of 50 wt. % or less. The solid carbon black material may comprise the oxidized carbon black having a pH of greater than 7 in an amount between any of the recited lower and upper limit values, such as in a range of 10 to 100 wt. %, such as 50 wt. % to 99 wt. %. Preferably, the solid carbon black material consists of the oxidized carbon black having a pH of greater than 7.

The solid carbon black material may optionally comprise in addition to the above-described oxidized carbon black having a pH of greater than 7, one or more other carbon black(s). Such optional other carbon black(s) are not particularly limited and can comprise any conventional non-oxidized or oxidized carbon black, for example conventional acid-functional oxidized carbon blacks and/or ASTM-grade carbon blacks selected from the N100 to the N900 series as classified according to ASTM D1765. If used, the solid carbon black material comprises such optional other carbon black(s) typically in an amount of less than 50 wt. %, such as 30 wt. % or less, or 20 wt. % or less, or 10 wt. % or less, or 5 wt. % or less, or 1 wt. % or less, or 0.5 wt. % or less, based on the total weight of the solid carbon black material. Preferably, the solid carbon black material does not contain any other carbon black than the oxidized carbon black having a pH of greater than 7.

The solid carbon black material may optionally comprise components other than carbon blacks. Thus, it may comprise one or more auxiliary substance(s) or processing aids, which may conventionally be used in the art of formulating solid carbon black materials, such as for example flow additives, rheology modifiers, pelletizers or fillers. Such optional auxiliary substance(s), if used, will be employed in effective amounts as they are commonly used in the art to achieve their respective intended functionality. Typically, the solid carbon black material according to the present invention contains in total 20 wt. % or less, such as 10 wt. % or less, or 5 wt. % or less, or 1 wt. % or less, or 0.5 wt. % or less, of such optional components other than carbon blacks, if used at all, based on the total weight of the solid carbon black material. Preferably, the solid carbon black material does not contain such optional components other than carbon blacks.

As set forth above, the present invention also concerns compositions, which comprise the solid carbon black material of the present invention and a polymer component. In other words, the present invention relates also to the use of the solid carbon black material in polymeric compositions.

The term "composition" as used herein refers to a material composed of multiple constituent chemical species or components. The term "polymeric composition" refers to a composition that comprises at least one polymer component. Accordingly, the "polymeric composition" can comprise a single type of polymeric material or two or more types of different polymeric materials as polymer component. A "polymeric material" is understood as a material essentially consisting of a polymer. The term "polymer" is used herein in its common meaning in the art, referring to macromolecular compounds, i.e. compounds having a relatively high molecular mass (e.g. 500 da or more), the structure of which comprises multiple repetition units (also referred to as "mers") derived, actually or conceptually, from chemical species of relatively lower molecular mass.

The composition according to the invention can in particular be a curable composition, such as for example a vulcanizable rubber composition. The term "vulcanizable rubber composition" refers to a composition of a rubber component optionally with various further ingredients conventionally used in the art of rubber compounding that can be cured by vulcanization under formation of a vulcanizate. The terms "curable" and "vulcanizable" are used interchangeably throughout this description unless otherwise stated and refer to a chemical reaction linking polymer chains to each other by means of a cross-linker or vulcanizing agent. The curing reaction can be induced by any means known in the art such as by light, moisture, heat and/or addition of a crosslinker.

Polymer materials that can be used in the polymer component of the compositions according to the present invention are however not limited and can comprise any kind of organic or inorganic polymer material. Polymeric materials that can be employed according to the present invention include thermoplastic polymers, duroplastic or thermoset polymers as well as mixtures or combinations thereof. For example, polymeric materials that can be used in compositions of the present invention include epoxies, acrylics, urethanes, polyesters, polycarbonates, polysulfones, polyimides, polyethers, such as polyether sulfone, and polyolefins such as light, medium and high density polyethylene, ethylene-propylene copolymers, either with random or block configuration, polypropylene-maleic acid anhydride, polystyrene, styrene-acrylonitrile copolymers, acrylonitrile-butadiene-styrene copolymers, ethylene vinyl acetate, ethylene-acrylic acid copolymers, vinyl chloride-polypropylene copolymers, polyisobutylene, polybutadiene, and crosslinked polyethylene, whether chemically, thermally, UV or E-beam (EB) crosslinked, and polyphenylene sulfide, polyetheretherketone, polyetherimide, polyarylsulfone and polypropylene oxide modified polyether sulfones, or mixtures or combinations of any of the foregoing.

Particularly useful as polymeric materials for the practice of this invention are elastomers and rubber materials. The polymer component of the composition according to the present invention can accordingly comprise one or more than one rubber or elastomer. Rubbers and elastomers that can be used according to the present invention include those containing olefinic unsaturation, i.e. diene-based rubbers or elastomers, as well as non-diene-based rubber materials or elastomers. The terms "rubber", "rubber material" and "elastomer" may be used interchangeably throughout this description unless otherwise stated. The term "diene-based rubber" is intended to include both natural and synthetic rubbers or mixtures thereof. Natural rubber can be used in its raw form and in various processed forms conventionally known in the art of rubber processing. Without being limited thereto, synthetic diene-based rubber may be any rubber containing at least one diene-based monomer that alone or with other monomers constitutes the rubber. Exemplary diene-based rubber materials suitable in the practice of the invention include, but are not limited to, natural rubber, emulsion-styrene-butadiene rubber, solution-styrene-butadiene rubber, polybutadiene, polyisoprene, ethylene-propylene-diene rubber (EPDM), butyl rubber and halogenated butyl rubber, acrylonitrile-butadiene rubber, hydrogenated acrylonitrile-butadiene rubber, polychloroprene, or any combination thereof. Exemplary non-diene-based rubber materials suitable in the practice of the invention include, but are not limited to, ethylene-propylene rubber (EPM), chlorinated polyethylene, chlorosulfonated polyethylene, acrylate rubber, ethylene-vinylacetate rubber, ethylene-acrylic rubber, epichlorohydrin rubber, silicone rubber, fluorosilicone rubber, fluorocarbon rubber or any combination thereof. Suitable rubbers also include functionalized rubbers and rubbers coupled to silicon or tin. For example, rubbers can be functionalized with functional groups like amine, alkoxy, silyl, thiols, thioesters, thioether, sulfanyl, mercapto, sulfide or combinations thereof. The one or more functionalities can be primary, secondary or tertiary and can be located at one or both chain ends (e.g. $\alpha,\omega$-functionalization), pendant from the polymer backbone and/or provided within the chain of the polymer backbone. The rubber according to the invention can also be partially cross-linked. Thus, prior to use in the composition of the present invention, part of the polymer chains of the rubber material can be cross-linked either by means of a coupling agent or without. The polymer component can comprise a single rubber or elastomer or a mixture or combination of more than one rubber or elastomer, optionally in combination with one or more other polymeric material(s) such as those mentioned above. Non-limiting specific rubber materials that can be used in the practice of the present invention comprise for example SMR10 rubber, commercially available from Weber and Schaer, Vamac® Ultra HT, commercially available from DuPont, Noxtite RE 461®, commercially available from Unimatec, Europrene® 1500 and Europrene SOL R C2525, commercially available from Versalis, or Keltan® 4455 rubber commercially available from Arlanxeo.

The polymer component typically represents a main component of the composition according to the present invention. It may for example comprise 30 wt. % or more, based on the total solids weight of the composition. For example, the polymer component can comprise 40 wt. % or more, such as 50 wt. % or more, or 60 wt. % or more of the composition, based on the total solids weight of the composition. The polymer component can for example comprise up to 99 wt. %, such as 95 wt. % or less, or 90 wt. % or less, or 85 wt. % or less, or 80 wt. % or less, or 75 wt. % or less, or 70 wt. % or less of the composition, based on the total solids weight of the composition. The composition according to the present invention may comprise the polymer component in an amount between any of the recited lower and upper limit values. For example, the polymer component can be comprised in an amount in a range from 30 wt. % to 90 wt. %, such as from 50 wt. % to 80 wt. %, based on the total solids weight of the composition.

The composition contains as a further characteristic component in addition to the polymer component the solid carbon black material according to the present invention, which is described in detail above. The composition of the present invention may for example comprise the solid carbon black material in an amount of 1 phr or more, such as 2 phr or more, or 5 phr or more, or 10 phr or more, or 20 phr or more, or 30 phr or more, or 40 phr or more, or 50 phr or more, or 60 phr or more. The composition of the present invention may for example comprise the solid carbon black material in an amount of 150 phr or less, such as 100 phr or less, or 90 phr or less, or 80 phr or less, or 70 phr or less. The composition according to the present invention may comprise the solid carbon black material in an amount between any of the recited lower and upper limit values. For example, the solid carbon black material can be comprised in the composition in an amount in a range from 1 to 100 phr, such as from 10 to 100 phr, or from 30 to 80 phr. As used herein, the term "phr" refers to parts by weight of the recited respective material (here: the solid carbon black material) per 100 parts by weight of the polymer component.

The composition according to the present invention may optionally comprise one or more further fillers in addition to the solid carbon black material of the present invention. Such optional filler material may include for example, without being limited thereto, conventional carbon black materials, carbon nanotubes, carbon fibers, graphite, metal fibers, and metal compounds such as silica, organo-silica, titanium dioxide, calcium carbonate, clays, calcium silicate, zinc sulfide, hydrous alumina, calcined magnesia or the like. Such fillers, if used, are typically employed in amounts of up to 30 phr, such as from 0.1 to 20 phr or from 1 to 10 phr.

The composition according to the present invention may also comprise at least one vulcanizing agent. Possible vulcanizing agents include any vulcanizing agents known from the art such as sulfur and sulfur donors. Sulfur donors suitable for the practice of the present invention include for example dithioalkanes, dicaprolactamsulfides, polymeric polysulfides, sulfur olefin adducts, thiurams and sulfonamides with at least two sulfur atoms in the sulfur bridges. Preferably elemental sulfur may be used. The vulcanizing agent may typically be used in an amount ranging from 0.5 to 10 phr, such as from 1 to 5 phr, in the composition according to the present invention.

The composition according to the invention may further comprise one or more other additives commonly used in the art of formulation. Such additives include, for example, curing aids such as primary and secondary vulcanization accelerators, activators, and pre-vulcanization inhibitors, processing additives such as oils, waxes, resins, plasticizers, softeners, or theology modifiers, pigments, peptizing agents, coupling agents, surfactants, biocides and anti-degradants such as heat or light stabilizers, anti-oxidants and anti-ozonants. The person skilled in the art will select such optional additives and their respective amounts in accordance with the desired properties and/or application of the polymeric composition. Useful as primary and secondary vulcanization accelerators are for example guanidines, dicarbamates, dithiocarbamates, thiurams, thioureas, 2-mercaptobenzothiazole, benzothiazole sulfonamides, aldehydeamines, amines, disulfides, thiazoles, xanthates, and sulfenamides. As specific examples it may be referred for instance to N-tert.-butyl-2-benzothiazyl sulfenamide commercially available under the tradename Rhenogran TBBS-80 from Rhein Chemie Additives. As one advantage of the present invention, vulcanizable polymer compositions according to the present invention can be cured with relatively low amounts of vulcanization accelerators or even without the same within reasonable times. Thus, vulcanization accelerators, if used at all, may be employed in amounts of less than 3 phr, or less than 2 phr, or even less than 1 phr, such as in a range from 0.05 to 3 phr, like in a range from 0.5 to 2 phr. This allows to avoid or minimize the use of accelerator substances under environmental and/or toxicological concern such as DPG. The composition according to the present invention may for example be substantially free of guanidine-type accelerators such as DPG, o-tolyl biguanidine (OTBG) or 1,3-di-o-tolylguanidine (DOTG). "Substantially free of guanidine-type accelerators" means herein that guanidine-type accelerators are not deliberately used in the composition. If present at all, they would thus be present in the compositions according to the present invention as an impurity in a low amount not significantly affecting the properties of the composition, such as in an amount of below 0.1 wt. %, based on the total solids weight of the composition. The composition according to the present invention may for example be completely free of guanidine-type accelerators, that is not contain guanidine-type accelerators at all. Suitable vulcanization activators that can be used in the composition according to the present invention include for example combinations of zinc oxide or the like with a fatty acid like stearic, lauric, palmitic, oleic or naphthenic acid. If used, such activators are typically employed in amounts of 1 to 10 phr, such as 2 to 5 phr.

The composition according to the present invention may optionally further comprise water and/or one or more than one organic solvent. For example, water and/or the organic solvent can serve as a dissolving or dispersing medium for the polymer component and the solid carbon black material. The composition according to the present invention may for example be a liquid composition such as an aqueous or organic dispersion. The composition according to the present invention may for example be an ink formulation or a coating or printing composition.

The composition of the present invention typically is provided though as a bulk material. The material can be processed by common plastics or elastomer processing technology. The composition according to the present invention can for example be obtained by combining the solid carbon black material of the present invention and any optional ingredients, if used, with the polymer component and mixing the same, e.g. to disperse the solid carbon black material and any optional ingredients, if used, in the polymer component. Dispersion can be achieved by any means known in the art such as by mixing, stirring, milling, kneading, ultrasound, a dissolver, a shaker mixer, rotor-stator dispersing assemblies, or high-pressure homogenizers or a combination thereof. For example, a lab mixer with intermeshing rotor geometry can be used. The dispersing can for example be conducted until the solid carbon black material is homogeneously dispersed in the polymer component resulting in a dispersion index of larger than 95% or more, preferably 97% or more, or more than 99% according to the classification pursuant to ASTM D2663-88, test method B.

Preparation of the composition according to the present invention may for example be conducted in a multiple step process: At first, the solid carbon black material and option-ally non-curative additives, if used, may be added to the polymer component concomitantly or successively. The polymer component, the solid carbon black material and the additives, if used, may then be mixed, typically at a tem-perature in a range from 40° C. to 160° C. for a total mixing time of less than 10 min, such as in a range from 2 to 8 min. Subsequently, the obtained mixture may be blended with one or more curative additives for less than 5 min, typically less than 3 min, preferably for about 2.5 min, at a temperature of less than 115° C.

The process can comprise further steps such as extrusion or cooling down the product to room temperature and storing it for further processing. The process can further comprise a curing step, which can for example be carried out by subjecting the composition to thermal curing conditions, e.g. a temperature of 120-200° C. for a time of 5 minutes to 3 hours. Curing can for instance be carried out in a curing press for example at a temperature of 140-180° C. for 5 to 60 minutes at a pressure between 100 and 150 bar.

As it will be appreciated, the compositions according to the invention can be utilized in various technical applica-tions requiring polymer-based materials with carbon black filler, e.g. for imparting antistatic or electrically conductive properties, color, mechanical reinforcement and/or low hys-teresis properties. Accordingly, the invention also relates to an article made from or comprising the afore-mentioned antistatic or electrically conductive polymeric composition. Non-limiting examples of such articles are for instance tires, tire components such as tire treads, cable sheaths, tubes, drive belts, conveyor belts, roll coverings, shoe soles, seal-ing members, profiles, dampening elements, coatings, and colored or printed articles. Due to the exceptional combi-nation of improved hysteresis properties in combination with suitable mechanical properties achievable by fast cur-ing without the need for large amounts of accelerators, particularly vulcanizable rubber compositions according to the present invention are of interest, e.g. for the production of fuel-saving tires or tire components with a reduced rolling resistance and heat build-up. Such tires include for example, without being limited thereto, truck tires, passenger tires, off-road tires, aircraft tires, agricultural tires, and earth-mover tires.

The invention will now be further illustrated by the following Examples. It is to be understood that the Examples are included for the sake of illustration, and are not to be construed as limiting to the present invention. In particular, the sought scope of protection shall not be limited by the specific Examples disclosed hereinafter, but is rather to be given the full breadth of the appended claims including any equivalents thereof.

EXAMPLES

All parts and percentages mentioned herein are based on weight, unless indicated otherwise.
Carbon Black Materials As a reference Printex® 60, a non-oxidized furnace black, which is commercially available from Orion Engineered Carbons GmbH was utilized (hereinafter referred to as Carbon Black A).

Furthermore, a conventional acidic oxidized carbon black with similar surface area and structure to the reference black, which is obtained by oxidation of the Printex® 60 carbon black and commercially available from Orion Engineered Carbons GmbH (hereinafter referred to as Carbon Black B), was employed.

About 5 kg of powder of Carbon Black A or B, respec-tively, was wet beaded. To this end, the powder was intro-duced into a stationary batch mixer (so-called "Papen-meier", type GRP 625/1.0 from Geppert Rührtechnik GmbH). Deionized water was then slowly added under agitation (300 rpm) until the carbon black started to granu-late, which is typically at a weight ratio of about 1:1, subsequently the agitation speed increased to 600 to 800 rpm. The thus obtained mixture was then homogenized on a roller block with a plastic drum having a length of 600 mm and a diameter of 350 mm at 28 rpm for 10 minutes. Thereafter, the beaded material was dried in an oven at 120° C. until the residual moisture content was <1%. The size distribution of the thus obtained pellets was determined as set forth below.

A carbon black material according to the present inven-tion (hereinafter referred to as Carbon Black C) was fur-thermore prepared by treating Carbon Black B with aqueous sodium hydroxide solution. For this purpose, about 5 kg of powder of Carbon Black B was wet beaded following the procedure described above, but using 0.4 M aqueous sodium hydroxide solution instead of deionized water.

The properties of the employed different beaded carbon blacks are summarized in Table 1:

TABLE 1

| | Carbon black A (Comp. Ex.) | Carbon black B (Comp. Ex.) | Carbon black C |
|---|---|---|---|
| BET [m²/g] | 112 | 115 | 98 |
| STSA [m²/g] | 97 | 93 | 89 |
| IAN [mg/g] | 119 | 61 | 66 |
| OAN [mL/100 g] | 109 | 105 | 104 |
| COAN [mL/100 g] | 90 | 95 | 95 |
| Oxygen content [wt. %] | 0.4 | 2.2 | 2.4 |
| Volatiles @ 950° C. [%] | 1.0 | 3.8 | 3.7 |
| pH | 6.3 | 2.7 | 8.0 |
| Carboxylic acid groups [µmol/g] | — | 179 | — |
| Tint strength | 111.6 | 109.6 | 109.6 |
| Jetness M_Y [%] | 238.75 | 242.6 | 243.3 |
| Aggregate size distribution | | | |
| Mode [nm] | 74 | 74 | 73 |
| Full width at half maximum [nm] | 64 | 64 | 64 |
| 75%/25% - width | 1.66 | 1.65 | 1.66 |
| Fraction > 150 nm [wt. %] | 5.9 | 5.3 | 5.3 |
| Pellet Size distribution | | | |
| <0.125 mm [wt. %] | 5 | 1.2 | 0.2 |
| 0.125-0.25 mm [wt. %] | 9.5 | 3.6 | 0.2 |
| 0.25-0.5 mm [wt. %] | 30 | 11.4 | 0.7 |
| 0.5-1.0 mm [wt. %] | 35.7 | 20.8 | 9.7 |
| 1.0 mm-2.0 mm [wt. %] | 17.4 | 42.6 | 54.1 |
| >2.0 mm [wt. %] | 2.4 | 20.4 | 35.1 |

Applied Methods for the Characterization of the Carbon Blacks

The BET surface area was measured by nitrogen adsorption in accordance with ASTM D6556-17.

The statistical thickness surface area (STSA) was determined according to ASTM D6556-17.

The iodine absorption number (IAN) was determined according to ASTM D1510-19.

The oil absorption number (OAN) was measured according to ASTM D2414-18.

The oil absorption number for compressed samples (COAN) was determined according to ASTM D3493-18.

The pH was measured according to D1512-15b, Test Method B—Sonic Slurry using an inoLab Multi 9420 IDS from WTW GmbH.

Tint strength was measured according to ASTM D3265-17.

The jetness MY was determined according to DIN 55979-1989.

Volatiles at 950° C. were measured using a thermogravimetric instrument of Fa. LECO Instrumente GmbH (TGA-701) according to the following protocol: Pans were dried at 650° C. for 30 min. The carbon black materials were stored in a desiccator equipped with desiccant prior to measurements. Baked-out pans were loaded in the instrument, tared and filled with between 0.5 g to 10 g carbon black material. Then, the oven of the TGA instrument loaded with the sample-filled pans was gradually heated up to 105° C. by automated software control and the samples were dried until a constant mass was achieved. Subsequently, the pans were closed by lids, the oven was purged with nitrogen (99.9 vol % grade) and heated up to 950° C. The oven temperature was kept at 950° C. for 7 min. The content of volatiles at 950° C. was calculated using the following equation:

$$\text{Volatiles} = \frac{m(\text{prior to heating}) - m(\text{after 7 minutes} @ 950° \text{ C.})}{m(\text{prior to heating})} \cdot 100\%.$$

Carboxylic acid groups per unit mass carbon black were determined according to the following protocol: The carbon black was dried overnight in a compartment drier set at a temperature of 125° C. The hot carbon black material was removed from the drier and allowed to cool down in a desiccator containing a desiccant. In three thoroughly cleaned and dried Erlenmeyer flasks each $m_{CB}$=1.5±0.1 g carbon black material was weighed and to each 25 mL 0.05 molar aqueous sodium bicarbonate solution (Titrisol grade diluted in bi-distilled water) were added. Air inside the flasks was replaced by nitrogen gas and flasks were sealed by plugs additionally secured by taping with parafilm. Flasks were placed in a shaker overnight at 100 rpm. After that, the resulting suspensions were pressure filtered using nitrogen gas at a pressure of 5 bar. Of each filtrate 10 mL were transferred in a beaker. 20 mL of 0.025 molar sulfuric acid (Titrisol grade diluted in bi-distilled water) were added to each beaker and carbonate was removed by boiling up for a short time. Subsequently, the samples were titrated back to pH 6.5 using 0.05 molar sodium hydroxide solution (Titrisol grade diluted in bi-distilled water). The required volume of sodium hydroxide solution $V_{NaOH}$ was determined in mL at a precision of three decimal places. Two blanks were measured and the required volumes of sodium hydroxide solution were averaged (Vblank, averaged). The concentration of carboxyl groups in µmol/g was calculated for all three samples using the following formula and the resulting values were averaged.

$$[\text{Carboxyl groups}] = 25 \cdot \frac{V_{NaOH} - V_{blank,averaged}}{10 \cdot m_{CB}} \cdot 0.05 \cdot 1000$$

The oxygen content was measured by quantitative elemental analysis using an automated elemental analyser (vario EL cube elemental analyser from Elementar Analysensysteme GmbH) following DIN 51732-2014-07. 4 mg±1 mg of the dry carbon black to be analyzed were weighed into a tin capsule on a scale with a precision of 1 µg. The filled capsule was then sealed in a capsule press under helium atmosphere. The thus prepared sample was then introduced to the calibrated vario EL cube elemental analyser and analysed for its oxygen content.

The pellet size distribution was determined according to ASTM D1511-10.

The aggregate size distribution was measured by light scattering using a Brookhaven BI-DCP disc centrifuge in accordance with ISO 15825:2015-06.

Preparation of Vulcanizable Rubber Compositions of Examples 1-3

Vulcanizable rubber compositions of the formulations set forth in Table 2 were prepared according to the following procedure using the different beaded carbon blacks A to C.

The preparation was performed using a multistep mixing procedure. Each mixing step was conducted in an internal mixer with intermeshing rotor geometry (GK 1.5 E).

At first, the rubber component was added to the mixing chamber of the internal mixer operated at 45 rpm and a chamber temperature of 40° C. and was plasticized for 30 seconds. After that the TDAE, ZnO, stearic acid and half of the amount of the respective carbon black was added and mixed for 75 seconds. The ram was lifted and cleaned followed by addition of the remainder of the carbon black component and then additional 135 seconds of mixing. It was secured that the maximum temperature did not reach more than 160° C. during this step. The fill factor of the internal mixer was 0.68.

After storing for at least 12 hours, the mixture was agitated at 48 rpm for 150 seconds in the internal mixer in a second mixing step with a chamber temperature of 60° C. It was secured that the maximum temperature did not reach more than 155° C. during this step.

Subsequently, sulfur and TBBS-80 were added to the mixture and agitated for 2 minutes in the internal mixer at 33 rpm and a chamber temperature of 40° C. It was secured that the maximum temperature did not reach more than 110° C. during this step.

The resulting mixture was then allowed to cool down to provide the respective vulcanizable rubber composition.

TABLE 2

| Ingredient (amounts in parts by weight elastomer, phr) | Example 1 (Comp. Ex.) | Example 2 (Comp. Ex.) | Example 3 |
|---|---|---|---|
| Europrene SOL R C2525[1] | 100 | 100 | 100 |
| Carbon Black A | 59 | — | — |
| Carbon Black B | — | 59 | — |
| Carbon Black C | — | — | 59 |
| TDAE[2] | 10 | 10 | 10 |
| ZnO | 2 | 2 | 2 |
| Stearic acid | 2 | 2 | 2 |
| Rhenogran TBBS-80[3] | 1.7 | 1.7 | 1.7 |
| Sulfur | 1.5 | 1.5 | 1.5 |

[1]SSBR commercially available from Versalis
[2]process oil Vivatec 500, commercially available from Hansen & Rosenthal
[3]Accelerator, commercially available from Rhein Chemie Additives Curing of the Vulcanizable Rubber Compositions of Examples 1-3

The vulcanizable rubber compositions according to Examples 1-3 were each subjected to curing in a curing press for 20 minutes at 150° C. The applied pressure was between 120 and 150 bar.

The thus obtained cured rubber compositions were tested for their properties as follows:

Mooney-Viscosity (ML (1+4) 100° C.) was measured according to ISO 289-1:2015.

Hardness was measured according to DIN 53 505.

Bound rubber was measured according to the following procedure: A rubber sample of about 0.2 g was cut in small pieces, weighed using an analytical balance and placed in a wire basket (320-mesh, stainless, 22 mm diameter, 40 mm in height) filled with glass wool in such a way that the sample did not come in contact with the wire basket. The sample-containing basket was placed in a 100 mL flask with screw cap and 50-60 mL toluene (analytical grade) were added to result in a minimum filling level of 20 mm above the bottom of the flask. The flask was allowed to stand for 7 days at a temperature of 23±2° C., whereby the flask was swirled every morning and evening. The toluene was replaced after 1 to 3 days. After the 7 days, the basket with the bound rubber gel therein was removed from the flask and allowed to emit the solvent overnight in a fume hood. Subsequently, the sample was dried overnight in a compartment drier until mass was constant. After allowing to cool down to room temperature in a desiccator, the sample was weighed (m (dried gel)). The portion of bound rubber in weight-% based on the mass of the original sample was calculated using the following formula:

$$\text{Bound Rubber} = \frac{m_{dried\ gel} - m_{filler,original\ sample}}{m_{polymer,original\ sample}} \cdot 100\%$$

It was assumed that the mass of the carbon black filler in the gel is the same as the mass of the carbon black filler in the original sample (m (filler, original sample)).

Tensile strength, elongation at break, Modulus 100%, Modulus 200%, Modulus 300% and Modulus 500% were measured according to DIN 53 504.

Tear Resistance was measured according to DIN ISO 34-1:2016-09, method B, variant (b) using an angle test specimen with notch, measuring the force required for enlargement of the preformed notch.

The thus obtained results are summarized in Table 3.

TABLE 3

| Property | Example 1 (Comp. Ex.) | Example 2 (Comp. Ex.) | Example 3 |
|---|---|---|---|
| ML(1 + 4) 100° C. [MU] | 78 | 78 | 79 |
| Hardness [Sh. A] | 65 | 64 | 64 |
| Bound Rubber [%] | 33 | 39 | 39 |
| Modulus 100% [MPa] | 2.5 | 1.6 | 2.2 |
| Modulus 200% [MPa] | 6.6 | 2.9 | 4.6 |
| Modulus 300% [MPa] | 12.0 | 4.7 | 8.4 |
| Modulus 500% [MPa] | 22.3 | 8.4 | 16.7 |
| Tensile strength [MPa] | 22.8 | 10.4 | 17.6 |
| Elongation at break [%] | 515 | 680 | 525 |
| Tear Resistance Graves [N/mm] | 25.1 | 26.6 | 27.4 |

The results in Table 3 indicate that rubber articles with significantly improved hysteresis properties as evidenced by increased bound rubber can be obtained by the use of an oxidized carbon black in the rubber composition versus a corresponding reference carbon black which has not been oxidatively treated (cf. Examples 2 and 3 versus Example 1). Use of a conventional acid-functional oxidized carbon black however significantly degrades mechanical properties of the cured rubber composition, as evidenced by significantly lower modulus and tensile strength in case of Example 2 versus Example 1. Use of an oxidized carbon black according to the present invention (Example 3) significantly improves these mechanical properties compared to the conventional acid-functional oxidized carbon black, without adversely affecting the bound rubber.

The cured rubber composition incorporating the oxidized carbon black according to the present invention (Example 3) thus exhibits mechanical properties, which more closely reflect those achieved with a corresponding reference carbon black which has not been oxidatively treated (Example 1), while exhibiting significantly improved hysteresis properties as suggested by increased bound rubber. The cured rubber composition incorporating the oxidized carbon black according to the present invention (Example 3) moreover exhibit a tear resistance, which is superior to the one obtained according to Comparative Examples 1 and 2.

Preparation of vulcanizable rubber compositions with variation of content of accelerator Examples 4 to 6

Furthermore, vulcanizable rubber compositions of the formulations set forth in Table 4 were prepared using the beaded carbon blacks A to C, systematically varying the amount of N,N-diphenyl guanidine (DPG) vulcanization accelerator.

The preparation was performed as set forth above with respect to Examples 1-3, except that no TDAE was used and that the DPG accelerator, if any, was each added with the sulfur and TBBS-80 component to the rubber mixture. Each of examples 4 to 6 comprised the preparation of a series of four curable rubber compositions differing in the amount of DPG accelerator, which was varied from 0 phr (variant a), to 0.5 phr (variant b), 1.0 phr (variant c) and 2.0 phr (variant d) as set forth in Table 4.

22

Mooney-Viscosity, hardness, modulus, elongation at break and tear resistance were measured as described above with respect to Examples 1-3.

Additionally, loss factor tan δ and complex modulus E* were measured according to DIN 53 513 in strain-controlled mode (1±0.5 mm) on a cylindrical specimen (10 mm in height and 10 mm in diameter) at 60° C. with a frequency of 16 Hz.

Ball rebound was further measured according to a test method based on ASTM 3574 and DIN ISO 8307 carried out

TABLE 4

| Ingredients (amounts in parts by weight elastomer, phr) | Example 4 (Comp. Ex.) | Example 5 (Comp. Ex.) | Example 6 |
|---|---|---|---|
| Europrene SOL R C2525[1] | 100 | 100 | 100 |
| Carbon Black A | 59 | — | — |
| Carbon Black B | — | 59 | — |
| Carbon Black C | — | — | 59 |
| ZnO | 2 | 2 | 2 |
| Stearic acid | 2 | 2 | 2 |
| Rhenogran TBBS-80[2] | 1.7 | 1.7 | 1.7 |
| Rhenogran DPG-80[3] | a) 0 b) 0.5 c) 1.0 d) 2.0 | a) 0 b) 0.5 c) 1.0 d) 2.0 | a) 0 b) 0.5 c) 1.0 d) 2.0 |
| Sulfur | 1.5 | 1.5 | 1.5 |

[1]SSBR commercially available from Versalis
[2]Accelerator, commercially available from Rhein Chemie Additives
[3]Accelerator, commercially available from Rhein Chemie Additives Curing of the Vulcanizable Rubber Compositions The vulcanizable rubber compositions according to Examples 4-6 a)-d) were each subjected to curing in a curing press for up to 60 minutes at 160° C. The applied pressure was between 120 and 150 bar.

The curing of the rubber compositions was followed by measuring the change of torque over curing time with a moving-die-rheometer (MDR 2000E) following ISO 6502-3:2018. The measured data are plotted in FIG. 1 to illustrate the different curing characteristics of the rubber compositions.

The time to the maximum torque in the torque versus time plot, is considered as "time to cure", $t_{100}$. Times $t_{95}$, reported as an indicator for the curing characteristics in Table 5 below, each correspond to the time when 95% of the torque value attained at the corresponding $t_{100}$ value is reached in the ascending slope of the torque in the torque versus time plot.

The rubber compositions, each cured for their respective $t_{95}$ time (rounded up to the next integer in minutes, cf. Table 5 below), were tested for their properties as follows:

as follows: A cylindrical test sample with 35 mm in diameter and 19 mm in height was heated up to 60±0.2° C. It was assured that the circular areas of the test sample were smooth and parallel to each other. A steel ball with a diameter of 19 mm was allowed to fall from a drop height of 500 mm through a falling tube on one of the circular areas of the test sample. The height corresponds to the distance between the lowest point of the steel ball and the point of impact on the test sample. The time interval between the first and the second impact of the steel ball on the test sample was measured by a light barrier located closely above the point of impact on the test sample. The time resolution of the light barrier was $10^{-4}$ s. The time intervals measured in five runs per test sample were averaged and were applied to calculate the rebound height. The rebound height was then again utilized to calculate the ball rebound, which corresponds to the percental ratio of the rebound height to the drop height.

The thus obtained results are summarized in Table 5.

TABLE 5

| Property | Ex. 4a (Comp.) | Ex. 5a (Comp.) | Ex. 6a | Ex. 4b (Comp.) | Ex. 5b (Comp.) | Ex. 6b | Ex. 4c (Comp.) | Ex. 5c (Comp.) | Ex. 6c | Ex. 4d (Comp.) | Ex. 5d (Comp. | Ex. 6d |
|---|---|---|---|---|---|---|---|---|---|---|---|---|
| $t_{95}$ [min] | 18.8 | 35.8 | 19.4 | 11.3 | 19.2 | 11.9 | 8.5 | 12.3 | 9.2 | 5.6 | 6.8 | 5.9 |
| Cure time at 160° C. [min] | 19 | 36 | 20 | 12 | 20 | 12 | 9 | 13 | 10 | 6 | 7 | 6 |
| ML (1 + 4) 100° C. [MU] | 76 | 78 | 77 | 72 | 77 | 77 | 68 | 75 | 77 | 68 | 74 | 76 |
| Hardness [Sh. A] | 64 | 65 | 61 | 66 | 64 | 63 | 67 | 64 | 64 | 65 | 64 | 64 |
| Elongation at break [%] | 550 | 480 | 490 | 500 | 620 | 510 | 490 | 550 | 500 | 540 | 560 | 480 |
| Modulus 300% [MPa] | 11.7 | 10.5 | 8.8 | 11.8 | 9.0 | 9.8 | 12.4 | 11.8 | 11.0 | 11.0 | 10.8 | 10.9 |
| Tear Resistance Graves [N/mm] | 25.6 | 21.1 | 27.0 | 22.8 | 25.9 | 25.9 | 24.5 | 23.8 | 24.8 | 23.7 | 27.6 | 31.8 |

TABLE 5-continued

| Property | Ex. 4a (Comp.) | Ex. 5a (Comp.) | Ex. 6a | Ex. 4b (Comp.) | Ex. 5b (Comp.) | Ex. 6b | Ex. 4c (Comp.) | Ex. 5c (Comp.) | Ex. 6c | Ex. 4d (Comp.) | Ex. 5d (Comp. | Ex. 6d |
|---|---|---|---|---|---|---|---|---|---|---|---|---|
| Dynamic modulus E* 1 ± 0.5 mm, 60° C. 16 Hz | 8.63 | 8.86 | 8.44 | 8.98 | 8.68 | 8.40 | 8.97 | 8.59 | 8.57 | 8.56 | 8.32 | 8.37 |
| tan δ 1 ± 0.5 mm, 60° C. 16 Hz | 0.211 | 0.201 | 0.201 | 0.221 | 0.203 | 0.202 | 0.222 | 0.204 | 0.206 | 0.230 | 0.194 | 0.200 |
| Ball rebound, 60° C. [%] | 52 | 59 | 57 | 51 | 58 | 57 | 51 | 58 | 56 | 50 | 57 | 55 |

The plots shown in FIG. 1 and the $t_{95}$ data in Table 5 evidence that rubber compositions that contain an oxidized carbon black according to the present invention (Examples 6 a-d) vulcanize significantly faster than those incorporating a conventional oxidized carbon black containing the same amount of DPG accelerator (Examples 6 a-d). The rubber compositions that contain the oxidized carbon black according to the present invention (Examples 6 a-d) yield in fact comparable curing rates (e.g. $t_{95}$ values) as the corresponding rubber compositions containing the reference carbon black which has not been oxidatively treated (Examples 4 a-d)). Using the oxidized carbon black according to the present invention, vulcanization is therefore possible within commercially reasonable times at relatively low amounts of DPG accelerator as compared to conventional oxidized carbon black or even without DPG accelerator, thus enabling to minimize or avoid using potentially harmful and costly accelerator substances such as DPG. Furthermore, as illustrated by the data in Table 5, the oxidized carbon black according to the present invention moreover imparts analogously to conventional oxidized carbon blacks improved hysteresis properties to the rubber composition as evidenced by a reduced loss factor tan δ and an increased ball rebound versus a corresponding reference carbon black which has not been oxidatively treated in Table 5, however, without the drawback of significantly slowed down curing associated with the used of conventional oxidized carbon blacks. As evidenced by the data in Table 5, the rubber compositions incorporating the oxidized carbon black according to the present invention further exhibit acceptable mechanical properties, wherein tear resistance is even improved compared to the corresponding rubber compositions incorporating the reference blacks.

The invention claimed is:

1. A solid carbon black material comprising an oxidized carbon black having a pH of 7.5 or more, as determined according to ASTM D1512-15b Test Method B—Sonic Slurry, wherein the oxidized carbon black having a pH of 7.5 or more comprises less than 20 μmol/g of carboxylic acid groups.

2. The solid carbon black material according to claim 1, wherein the oxidized carbon black has a pH of at least 8, as determined according to ASTM D1512-15b Test Method B—Sonic Slurry.

3. The solid carbon black material according to claim 1, wherein the oxidized carbon black has a volatile content determined by thermogravimetry at a temperature of 950° C. of more than 1.0 wt. %, based on the total weight of the oxidized carbon black, and/or has an oxygen content determined by elemental analysis of at least 0.5 wt. %, based on the total weight of the oxidized carbon black.

4. The solid carbon black material according to claim 1, wherein the oxidized carbon black is an ozone oxidized carbon black and/or is an oxidized furnace black.

5. The solid carbon black material according to claim 1, wherein the oxidized carbon black comprises carboxylate groups in an amount of at least 100 μmol/g.

6. The solid carbon black material according to claim 1, wherein the solid carbon black material is in the form of a powder or beads.

7. The solid carbon black material according to claim 1, wherein the oxidized carbon black has one or more than one or all of the following:
   (a) a statistical thickness surface area (STSA), determined according to ASTM D 6556-17, in a range of 30 to 500 m²/g;
   (b) a BET surface area, determined according to ASTM D 6556-17, in a range of 50 to 500 m²/g;
   (c) an oil absorption number (OAN), determined according to ASTM D2414-18, in a range of 50 to 150 mL/100 g;
   (d) an oil absorption number for compressed sample (COAN), determined according to ASTM D3493-18, in a range of 50 to 150 mL/100 g;
   (e) an iodine absorption number, determined according to ASTM D1510-19, in a range from 20 to 300 mg/g.

8. The solid carbon black material according to claim 1, wherein the solid carbon black material consists of the oxidized carbon black having a pH of 7.5 or more, as determined according to ASTM D1512-15b Test Method B—Sonic Slurry.

9. A process for manufacturing a solid carbon black material comprising an oxidized carbon black having a pH of 7.5 or more, as determined according to ASTM D1512-15b Test Method B—Sonic Slurry, wherein the oxidized carbon black having a pH of 7.5 or more comprises less than 20 μmol/g of carboxylic acid groups, the method comprising:
   (i) providing an oxidized carbon black, and
   (ii) treating the oxidized carbon black with a base, and
   (iii) optionally wet beading the oxidized carbon black.

10. The process for manufacturing a solid carbon black material according to claim 9, wherein the base is used in an at least equimolar amount with respect to acidic groups in the oxidized carbon black.

11. A composition comprising:
   (i) a polymer component, and
   (ii) a solid carbon black material comprising an oxidized carbon black having a pH of 7.5 or more, as determined according to ASTM D1512-15b Test Method B—Sonic Slurry, wherein the oxidized carbon black having a pH of 7.5 or more comprises less than 20 μmol/g of carboxylic acid groups.

12. The composition according to claim 11, wherein the polymer component comprises natural rubber, emulsion-styrene-butadiene rubber, solution-styrene-butadiene rubber, polybutadiene, polyisoprene, ethylene-propylene-diene rubber EPDM, ethylene-propylene rubber EPM, halogenated butyl rubber, butyl rubber, chlorinated polyethylene, chlorosulfonated polyethylene, acrylonitrile-butadiene rubber, hydrogenated acrylonitrile-butadiene rubber, polychloroprene, acrylate rubber, ethylene-vinylacetate rubber, ethylene-acrylic rubber, epichlorohydrin rubber, silicone rubber, fluorosilicone rubber, or fluorocarbon rubber or a mixture of combination of any of the foregoing.

13. The composition according to claim 12, further comprising one or more additives selected from the group consisting of vulcanization agents, accelerators, activators, processing additives such as oils, resins, softeners, pigments, waxes, peptizing agents and anti-oxidants.

14. The composition according to claim 12, being substantially free of guanidine-containing accelerators.

15. The composition according to claim 11, wherein the composition further comprises water and/or one or more than one organic solvent.

16. The composition according to claim 15, wherein the composition is a liquid composition, an ink formulation, or a coating or printing composition.

17. The composition according to claim 11, wherein the composition comprises the solid carbon black material in an amount of 1 to 100 parts by weight, per 100 parts by weight of the polymer component.

18. An article prepared from a composition comprising: (i) a polymer component; and (ii) a solid carbon black material comprising an oxidized carbon black having a pH of 7.5 or more, as determined according to ASTM D1512-15b Test Method B—Sonic Slurry, wherein the oxidized carbon black having a pH of 7.5 or more comprises less than 20 $\mu$mol/g of carboxylic acid groups.

19. The article according to claim 18, selected from the group consisting of a tire, a tire component, a cable sheath, a tube, a drive belt, a conveyor belt, a roll covering, a shoe sole, a sealing member, a profile, a damping element, a coating, or a colored or printed article.

* * * * *